United States Patent
Vetter

(10) Patent No.: US 11,964,363 B2
(45) Date of Patent: Apr. 23, 2024

(54) GRINDING OR POLISHING BRUSH

(71) Applicant: EVE Ernst Vetter GmbH, Keltern (DE)

(72) Inventor: Dennis Vetter, Keltern (DE)

(73) Assignee: EVE ERNST VETTER GMBH, Keltern (DE)

( * ) Notice: Subject to any disclaimer, the term of this patent is extended or adjusted under 35 U.S.C. 154(b) by 1098 days.

(21) Appl. No.: 16/273,588

(22) Filed: Feb. 12, 2019

(65) Prior Publication Data

US 2019/0247981 A1 Aug. 15, 2019

(30) Foreign Application Priority Data

Feb. 14, 2018 (DE) .......................... 102018001162.4

(51) Int. Cl.
*A46B 9/04* (2006.01)
*A46B 9/02* (2006.01)
(Continued)

(52) U.S. Cl.
CPC ............ *B24D 13/145* (2013.01); *A46B 9/025* (2013.01); *A46B 9/04* (2013.01); *A46B 13/008* (2013.01);
(Continued)

(58) Field of Classification Search
CPC ..... B24D 13/145; A46B 13/008; A46B 13/02; A61C 3/06; A61C 17/22; A61C 17/222; A61C 17/005; B24B 29/00–10
See application file for complete search history.

(56) References Cited

U.S. PATENT DOCUMENTS

| | | | |
|---|---|---|---|
| 5,249,327 A * | 10/1993 | Hing | A61C 15/046 15/207.2 |
| 5,983,434 A | 11/1999 | Eichinger et al. | |
| 6,554,614 B1 * | 4/2003 | Dubbe | A61C 3/06 15/207.2 |
| 2010/0043165 A1 * | 2/2010 | Juentgen | A46B 3/02 15/159.1 |

(Continued)

FOREIGN PATENT DOCUMENTS

| | | |
|---|---|---|
| DE | 29724404 U1 * | 6/2001 |
| DE | 29724404 U1 | 6/2001 |

(Continued)

OTHER PUBLICATIONS

European Search Report issued by the European Patent Office in relation to European Application No. 19155895 dated May 17, 2019 (2 pages).

(Continued)

*Primary Examiner* — Yogesh P Patel
(74) *Attorney, Agent, or Firm* — Robert P. Michal, Esq.; Carter, DeLuca & Farrell LLP

(57) ABSTRACT

A grinding or polishing brush is provided and includes a main body which is rotatable about a central axis and is provided with bristles which extend with their center axes substantially in the direction of the central axis. In order, with such brushes, to permit pin point working, it is proposed that the center axes of the bristles have an inclination in the circumferential direction and/or inward in the radial direction. The effect which can therefore be achieved with the bristles is that they are supported against one another. In order to improve this, the bristles can be provided in an axial portion with film elements connecting them. The film elements may be able to come apart depending on wear.

8 Claims, 2 Drawing Sheets

(51) Int. Cl.
  *A46B 13/00* (2006.01)
  *A46B 13/02* (2006.01)
  *A61C 3/06* (2006.01)
  *A61C 17/22* (2006.01)
  *B24B 29/00* (2006.01)
  *B24D 13/14* (2006.01)
  *A46B 3/00* (2006.01)
  *A46B 9/08* (2006.01)

(52) U.S. Cl.
  CPC ............... *A46B 13/02* (2013.01); *A61C 3/06* (2013.01); *A61C 17/22* (2013.01); *A61C 17/222* (2013.01); *B24B 29/005* (2013.01); *A46B 3/005* (2013.01); *A46B 9/08* (2013.01); *A46B 2200/3086* (2013.01)

(56) References Cited

U.S. PATENT DOCUMENTS

2013/0007969 A1 1/2013 Driesen et al.
2013/0086764 A1* 4/2013 Vetter .................. A46B 3/005
                                                    15/207.2
2016/0206413 A1 7/2016 Kappel et al.

FOREIGN PATENT DOCUMENTS

DE    102011114916 A1   4/2013
WO         0041592 A1   7/2000
WO       WO0219942 A1 * 9/2000

OTHER PUBLICATIONS

German Examination Report dated Dec. 3, 2018 issued in corresponding DE Appln. No. 102018001162.4.

* cited by examiner

GRINDING OR POLISHING BRUSH

CROSS-REFERENCE TO RELATED APPLICATION

This Application claims priority to German Application No. DE 10 2018 001 162.4, filed on Feb. 14, 2018, the entire disclosure of which is hereby incorporated by reference herein.

BACKGROUND

Technical Field

The present disclosure relates to a grinding or polishing brush, and more particularly, a grinding or polishing brush with a main body which is rotatable about a central axis and is provided with bristles which extend with their center axes substantially parallel to the direction of the central axis.

Description of Related Art

Grinding or polishing brushes of this type are known in the art. They are in particular used by dentists when working on occlusal surfaces. In the case of dental technology products, such as ceramic fillings, inlays, crowns, etc. or corresponding elements composed of composite materials, it may be necessary to abade occlusal surfaces or regions in order to produce a suitable bite, i.e. the fitting together of teeth or rows of teeth opposite one another.

However, when rough grinding tools are used, the occlusal surface is at least partially roughened in an undesirable manner and therefore damaged, which can subsequently lead to undesirable abrasive wear in this region of layers located therebelow. It has turned out that, when said roughnesses are smoothed, the undesirable abrasive wear is avoided to a considerable extent, and therefore dental technology products correspondingly worked on can achieve the desired resistance capability and therefore service life despite the mentioned grinding in the occlusal region. For said smoothing, the previously ground regions are polished.

In order to permit corresponding polishing, the grinding or polishing brushes mentioned at the beginning are used, wherein the bristles are plastics materials mixed with grinding particles.

However, during the use of polishing brushes, it has now turned out that the bristles extending with their center axes substantially parallel to the central axis of the brush moves outward in the radial direction with their tips or distal ends when a contact pressure is applied in the axial direction via the brush. A desired pinpoint polishing of ground and therefore roughened occlusal surfaces is therefore in particular made considerably more difficult.

However, in comparable polishing brushes, the effect occurs time and again that the bristles move inward in the radial direction with their tips or distal ends, as a result of which the distance from the center of rotation changes. The energy introduced to the surface to be worked on therefore, however, also decreases, and the efficiency is thus reduced. Less material is therefore abraded. In order to compensate for this, users tend to build up a higher pressure on the brush, as a result of which, however, the admission of heat into the bristles is also increased. By means of the heating associated therewith, the bristles become softer and the efficiency of the working drops further. However, the discussed heating is also disadvantageous because it has an effect on the workpiece being worked on and virtually all modem dental materials are heat-sensitive.

SUMMARY

It is therefore an object of the present disclosure to develop a brush as described hereinabove in such a manner that none of the isadvantageous effects occur any longer.

This object is achieved according to the present disclosure in that bristles extending substantially parallel to the central axis have an inclination with their respective center axis in relation to the central axis.

This inclination is preferably substantially in the circumferential direction of the rotational movement, which means that, during the rotation of the brush about the central axis, the distal ends, i.e. tips of the bristles, precede the base points of the bristles, i.e. the points at which the bristles are fastened to the main body or merge into the latter.

In such a configuration, the brushes are pushed as it were with their distal ends, i.e. their tips, over the surface to be polished, as a result of which the forces arising at the bristle tip make yielding radially outward and radially inward difficult.

The inclination of the bristles in the circumferential direction is approximately 2° to 10°, preferably in particular 3° to 6°.

In a particularly preferred embodiment of the present disclosure, the bristles have an inclination inward in particular in the direction of the central axis. By means of this tilting toward the central axis, during the rotation of the brush with load being applied to the bristles a type of "entanglement" of the bristles lying next to one another is brought about, as a result of which said bristles are mutually supported and therefore the desired application of force in as punctiform a manner as possible is additionally assisted.

The inclination of the bristles or of the center axis thereof in the direction of the central axis is approximately 4° to 20°, preferably in particular 8° to 12°.

In a development of the present disclosure, the bristles are formed tapering in the direction of their extent toward their distal end, i.e. away from the main body. This makes it easier to dissipate the forces introduced into the bristles at the distal end thereof during the polishing operation through the bristles with the bristles simultaneously being stabilized against undesirable yielding. In particular, the configuration mentioned standardizes the yielding movement of the bristles, which leads to a better working result when using the brushes.

Such yielding can also be controlled to an increased extent by the fact that adjacent bristles have separable connections with one another in an axial region. Via separable connections of this type, first of all a freely movable region lying at the distal end of the bristle can be restricted in its axial extent, in which region the bristle can evade forces which act thereon at the bristle tip.

The fact that the connections are separable has a further effect: in the event of wear of the front bristle tip and a resulting shortening of said bristles, the freely movable regions of the bristles are stiffened. As a result, the forces which are conducted through the bristles are used to successively separate the separable connection between adjacent bristles. The length-dependent stiffness of the bristles at their ends can thus be maintained since the individual bristles are progressively separated in the described manner from their adjacent bristles and are thus successively singulated.

It has turned out that this leads to a very uniform efficiency over the lifetime of a brush with a simultaneously longer service life of the brush. The abovementioned uniform yielding movement of individual bristles specifically also leads to a slow uniform tearing open or separating of the connections. A corresponding brush can therefore also be used for longer in terms of time or repeatedly.

In a preferred development of the present disclosure, the separable connection is designed in particular as a film element.

By means of the configuration of the thickness of said film elements, it is also possible to influence the tearing-open behavior of said separable connection or film elements, as a result of which the wear behavior of the brush can also be positively determined.

For example, by the film elements having a correspondingly different thickness over their height, a specifically slow separating of the connection between adjacent bristles can also be achieved, with it therefore also being possible to bring about the effect that such a connection does not briefly or abruptly open over the entire height of the connecting portion.

In principle, a corresponding film element can be arranged both in a circumferential direction and in a radial direction of the brush.

In the case of an extent in the circumferential direction, the film element can extend between two adjacent bristles in a manner similar to a flag. In the case of an extent in the radial direction, the film element acts as an adhesive bond between two touching circumferential surfaces of two adjacent bristles.

It has turned out that, with brushes configured according to the present disclosure, the bristles change only insubstantially during the use of the brush. It can be concluded therefrom that they are subject only to little thermal loading during the processing operation and therefore the heat-sensitive dental material which is to be worked on is also subject to scarcely any thermal loading. With a brush configured according to the present disclosure, the stringent requirements regarding different pressure and tension ratios occurring during the polishing of dental surfaces with their free surfaces to be worked on can therefore be controlled.

Further advantages and features of the disclosure will become apparent from the following description of preferred embodiments with reference to the drawings.

DETAILED DESCRIPTION

Figure 1:
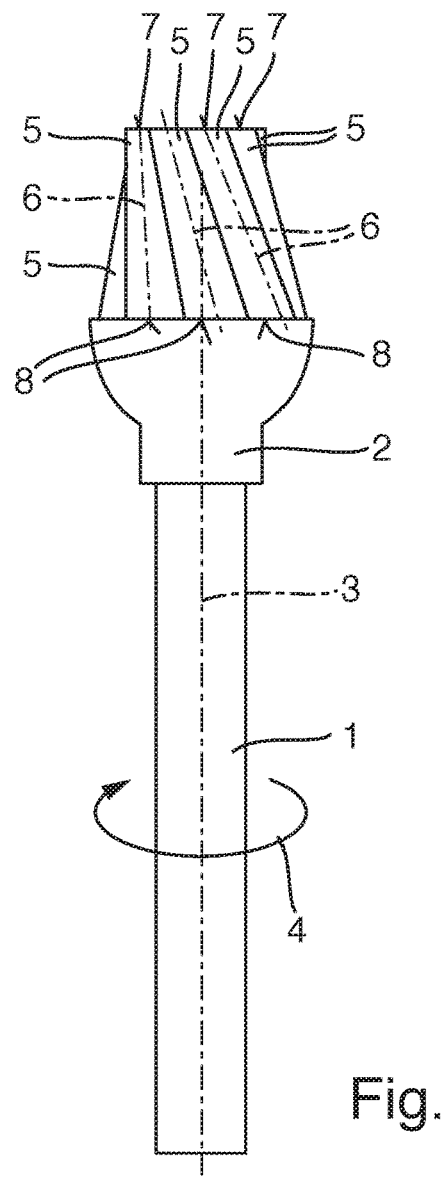
FIG. 1 shows the side view of the brush according to the present disclosure.

The side view of a grinding or polishing brush is seen in FIG. 1. At its lower end, it has a handle 1 with which it can be inserted into an instrument holder for a rotating tool. Such a tool is customarily used by dentists or dental laboratory technicians. The handle 1 here can if required also be provided at its lower end with a polygon (not illustrated here) or the like in order to transmit force within the instrument holder via a form fit.

A customary diameter for a handle of this type lies in the order of magnitude of 1 to 2 mm.

At its upper end, the handle 1 is provided with a main body 2 in a manner fixed against rotation. The main body 2 and handle 1 can be composed here of different materials (for example steel or plastic) or else of only one material and, in the latter case, can therefore also be produced integrally with each other.

During use of the grinding or polishing brush illustrated here, the main body 2 and the handle 1 are rotatable about a central axis 3. In the case of the brush illustrated here, a direction of rotation is provided in a clockwise revolving direction in top view as per arrow 4.

At a region facing away from the handle 1, the main body 2 is equipped with a multiplicity of bristles 5 which extend substantially parallel to the central axis 3. The diameter of such a grinding or polishing brush is within the range of between approximately 5 and 10 mm.

The bristles 5 of the brush are provided with grinding particles, either by the latter being integrated into the material of the bristles or else bonded thereon, and therefore, by means of application of a force along the central axis 3, the tip 7 of the bristles 5 can be pressed against an element to be polished and can lead here in the desired manner to polishing of said element via abrasion during the rotation provided in the process.

The bristles and the main body are customarily produced integrally with one another. They are composed, for example, of a plastic impregnated with grinding particles, such as, for example, PUR, synthetic rubber, polyamide, silicone or the like.

The hardness of the bristle material therefore lies within a range of approximately 80 to 100 SHORE A.

In the example illustrated here, the bristles 5 are not oriented with their center axes 6 parallel to the central axis 3, but rather an inclination is provided here, wherein the bristles 5 are inclined with their distal ends in the direction of the direction of rotation 4, i.e. precede their base points 8 with their distal ends 7 during rotation. The base points 8 here are the points at which the bristles 5 merge into the main body 2.

Said inclination in the direction of rotation and therefore in the circumferential direction is approximately 3° to 6°.

Figure 2:
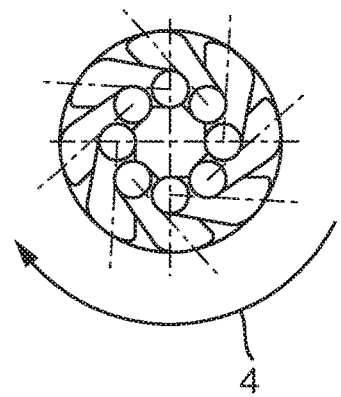
FIG. 2 shows the top view of a brush according to the present disclosure according to FIG. 1.

Furthermore, in the exemplary embodiment illustrated here, the center axes 6 of the bristles 5 have an inclination in the direction of the central axis 3, and therefore the distal ends 7 of the bristles 5 rotate with a smaller radius about the central axis 3 than the base points 8 of the bristles. This can readily be seen in the top view in FIG. 2.

The inclination of the bristles inward in the radial direction is approximately 8° to 12°.

It would also be within the scope of the present disclosure if the bristles 5 only have an inclination in the direction of the central axis 3, but do not have an inclination in the circumferential direction.

The effect brought about by the inclination(s) of the bristles is that, during an appropriate application of force parallel to the direction of the central axis 3, said bristles twist and entangle with one another and thus are supported against one another and therefore stabilize one another.

Figure 3:
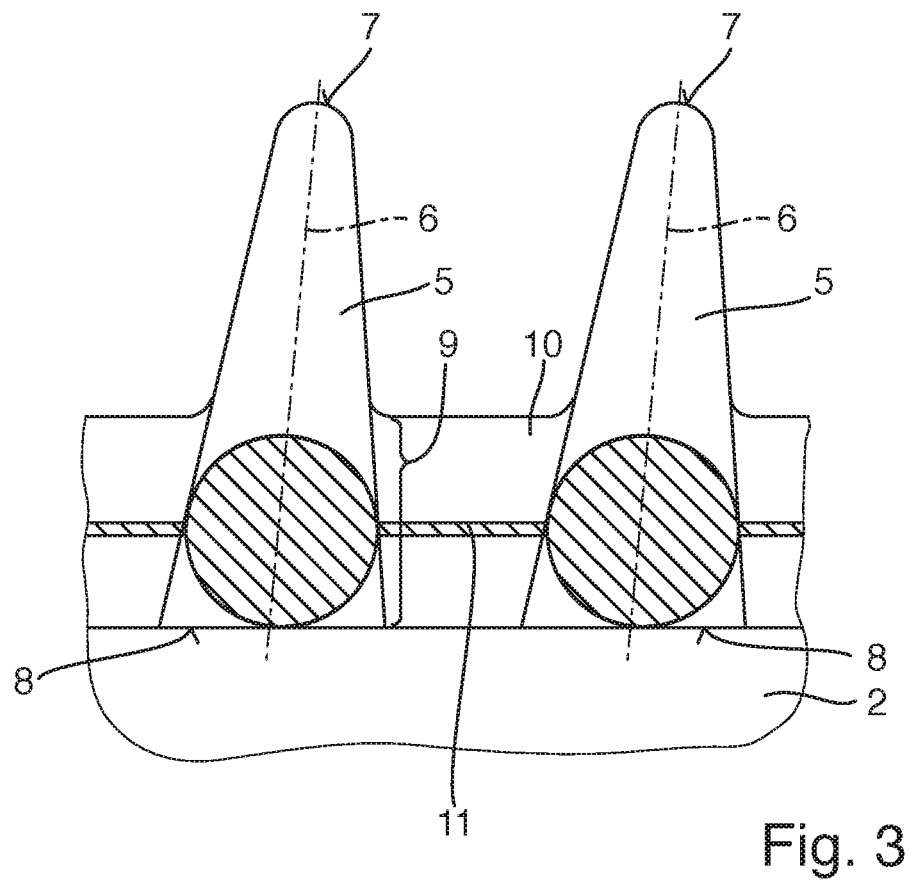
FIG. 3 shows the view of adjacent bristles connected in the circumferential direction by a film element.
Figure 4:
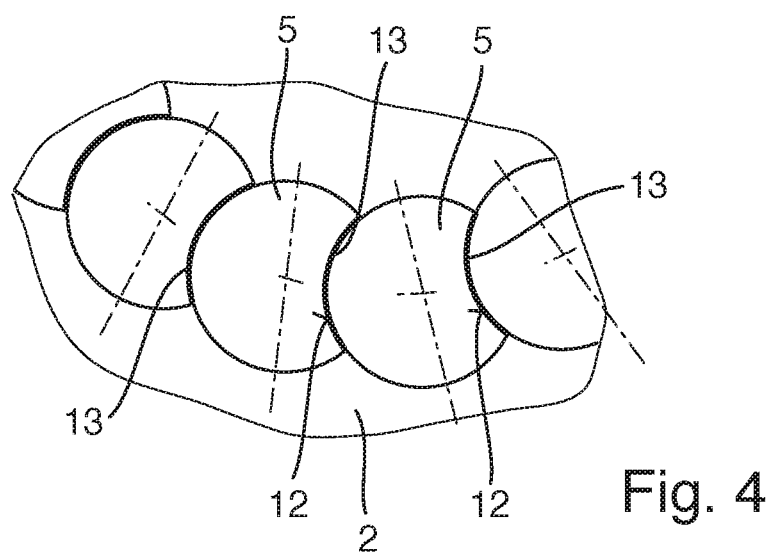
FIG. 4 shows the top view of an alternative configuration of bristles connected in the radial direction by a film element.

A further possibility of stabilizing the bristles is illustrated in FIGS. 3 and 4.

A side view of two adjacent bristles along the circumferential direction of the brush is seen in FIG. 3. Said bristles 5 are connected at their base point 8 to the main body 2 and extend from the latter with their center axes 6 to their distal ends 7, with said bristles tapering conically.

The two adjacent bristles 5 are connected to each other here in an axial region 9 by a film element 10 which is formed integrally on the bristles 5 and extends in the circumferential direction.

The film element 10 is now configured in such a manner that it can tear open if the forces which are input therein by the distal ends 7 of the bristles 5 that move freely during a polishing operation exceed a certain value. As a result, the size of the axial region 9 in which two adjacent bristles 5 are connected to each other is reduced. At the same time, that portion of the bristles 5 which lies above said axial region 9 is therefore extended, and therefore, in the event of wear of the bristles 5, which is associated with migrating of the bristle tip 7 in the direction of the base point 8, said portion lying above said axial region remains approximately identical in its length or else also increases. Despite the wear-induced shortening of the bristle 5, the free unsupported length of the bristle 5 therefore remains to a certain extent identical and therefore so too does the rigidity thereof which is dependent on said length remaining the same. The polishing properties of the brush therefore also do not change despite progressing wear.

The film elements 10, as can be seen in the cross section shown, are considerably reduced in their thickness in relation to the thickness of the bristles 5 that connects them to one another.

A top view of a brush having a plurality of bristles 5 standing close together is seen in FIG. 4. Said bristles have recesses 12 which are each concave on one side and into which adjacent bristles fit.

In the concave recesses therefore located between two adjacent bristles, film elements 13 which run substantially in the radial direction of the brush and in each case connect two adjacent bristles 5 to each other are provided. In particular, said film elements 13 here are designed as adhesive bonds along which the adjacent bristles can be separated from one another if, as described above, they are shortened because of wear, and therefore the free end of the bristles 5 is stiffened in a length-dependent manner.

In summary, with brushes developed in such a manner not only can more precise polishing results therefore be achieved, but the service life of a corresponding brush can also be extended according to the present disclosure.

LIST OF REFERENCE SIGNS

1 Handle
2 Main body
3 Central axis
4 Arrow (direction of rotation)
5 Bristles
6 Center axis
7 Distal ends
8 Base points
9 Axial region
10 Film element
11 Cross section
12 Concave recesses
13 Film elements

What is claimed is:

1. A dental surface grinding or polishing brush, comprising:
    a main body which is rotatable about a central axis and is provided with bristles which extend with their center axes in a direction of the central axis, wherein the bristles have an inclination in a circumferential direction relative to the central axis and are tilted inward in the direction of the central axis, and wherein the bristles are made from a plastic material impregnated with grinding particles, wherein the bristles of the brush twist and entangle with each other, and wherein the hardness of the bristles in the range of about 80-100 SHORE A.

2. The grinding or polishing brush as claimed in claim 1, wherein the inclination of the bristles is in a direction of rotation.

3. The grinding or polishing brush as claimed in claim 1, wherein the bristles taper in their extent away from the main body.

4. The grinding or polishing brush as claimed in claim 1, wherein adjacent bristles have separable connections with one another in an axial region.

5. The grinding or polishing brush as claimed in claim 4, wherein the axial region is adjacent to the main body.

6. The grinding or polishing brush as claimed in claim 4, wherein the connections are film elements running in the circumferential direction.

7. The grinding or polishing brush as claimed in claim 4, wherein the connections are film elements running substantially in a radial direction relative to the central axis, wherein the film elements are adhesive elements.

8. The grinding or polishing brush as claimed in claim 1, wherein the grinding particles are configured to cause abrasion to dental enamel during rotation.

\* \* \* \* \*